June 15, 1965 S. GOLDFEIN 3,189,669
PROCESS FOR SHIPPING FLEXIBLE POLYURETHANE FOAM
Filed Nov. 1, 1962
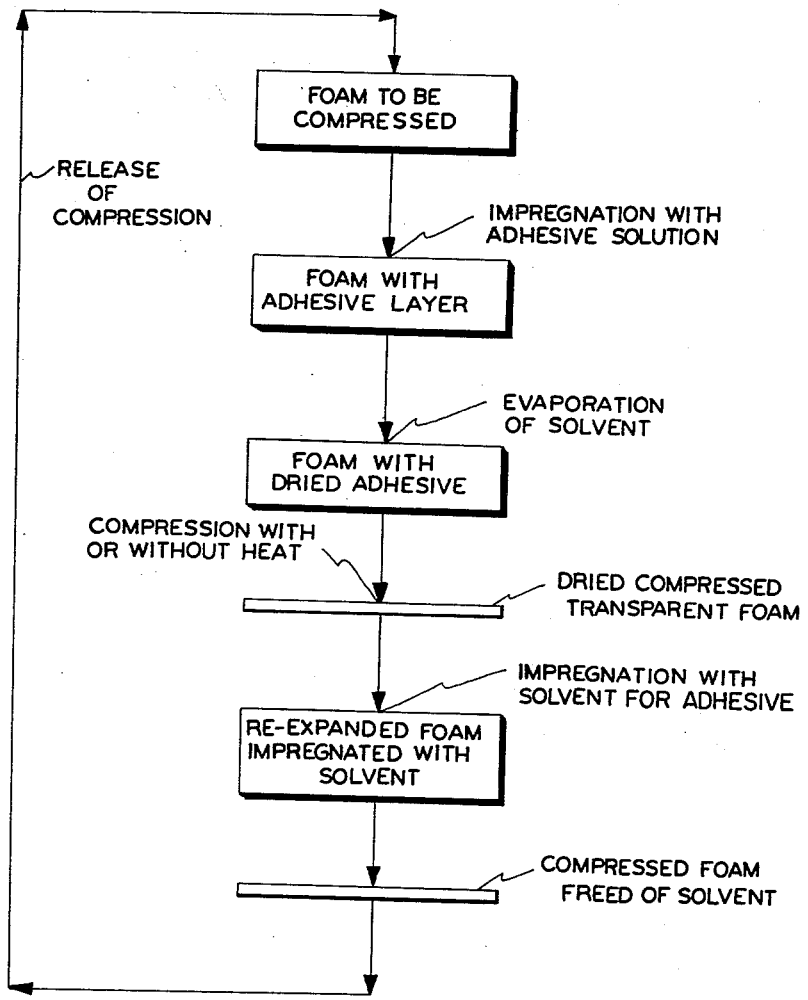
INVENTOR
Solomon Goldfein

United States Patent Office 3,189,669
Patented June 15, 1965

3,189,669
PROCESS FOR SHIPPING FLEXIBLE POLYURETHANE FOAM
Solomon Goldfein, Falls Church, Va., assignor to the United States of America as represented by the Secretary of the Army
Filed Nov. 1, 1962, Ser. No. 234,894
1 Claim. (Cl. 264—134)
(Granted under Title 35, U.S. Code (1952), sec. 266)

The invention described herein may be manufactured and used by or for the Government for governmental purposes without the payment to me of any royalty thereon.

This invention relates to the shipping of flexible polyurethane foam when the space involved is limited. Polyurethane foam is comprised of polyurethane liquid that has been foamed to a porous flexible rubber-like substance which has a cellular structure. When this flexible polyurethane foam has to be transported from one place to another such as by railway car or truck there is a problem involved in the volume of this foam. The foam in its cellular form has a very low density and therefore requires a large amount of space when it is transported. This invention concerns the reduction of the required space for transporting flexible polyurethane foam by compressing it and increasing its density. As polyurethane foam is cellular it can be compressed in its flexible form without damage to its cells. One of the problems in transporting the compressed foam has been the means to maintain the foam in this compressed condition during shipment and to re-expand the foam when it reaches its destination. It is costly to employ means to maintain a constant mechanical pressure on the compressed foam during shipment.

One of the objects of this invention is to provide a method for compressing flexible polyurethane foam for shipment and then re-expanding it when it reaches its destination.

Another object of this invention is to provide a method for re-expanding the previously compressed flexible polyurethane foam into either a flexible or rigid state.

Still another object of this invention is to provide a method for laminating a fibrous material on the surface of the re-expanded polyurethane foam to strengthen it.

Flexible polyurethane foam has a large percentage of its volume taken up by air cells within the foam. Upon compressing this flexible foam and releasing it, the foam springs back to its original form. Means to maintain the flexible foam in its compressed shape for shipment and yet re-expand it to its original shape would save a great amount of the shipping costs.

The present invention comprises the steps of impregnating flexible polyurethane foam with an adhesive solution removing the solvent by evaporation with heat, compressing the foam to a fraction of its original volume, and removing the same from the press. When the foam is removed from the press it is held in its compressed state by the adhesive, and the foam can be shipped to its destination in this compressed state. When it is desired to re-expand the foam, it is immersed in a solvent for the adhesive which allows the sample to expand to its original volume. After the sample is removed from the solvent the excess solvent is squeezed out.

The drawing is a flow sheet outlining the succession of steps employed in practicing the invention.

Any of a number of adhesives and their corresponding solvents can be used. The following are samples of a few of such adhesives and their solvents:

| Adhesive: | Solvent |
|---|---|
| Polyvinyl chloride-acetate copolymer. | Acetone, or methyl ethyl ketone. |
| Polystyrene | Gasoline, acetone or methyl ethyl ketone. |
| Acrylonitrile - butadiene - styrene. | Acetone, or methyl ethyl ketone. |
| Polymethyl methacrylate | Chlorinated ethers, chlorinated esters, acetone, or methyl ethyl ketone. |
| Dimethyl hydantoin formaldehyde. | Water. |
| Polyvinyl alcohol | Water. |

The adhesive dimethyl hydantoin formaldehyde when mixed with its solvent in the cells of polyurethane foam renders the foam transparent.

Flexible foam that has been re-expanded can be made into the rigid foam by impregnating the flexible foam with a plastic such as a 20% solution of polyvinyl chloride in a solvent of methyl ethyl ketone. Evaporation of the solvent makes the foam rigid. If reactivating this rigid foam to its flexible state is desired it can be accomplished by immersing the sample again in a 20% solution of polyvinyl chloride in a solvent of methyl ethyl ketone and the polyurethane foam becomes flexible until the solvent is removed whereby it again becomes rigid. To strengthen the rigid form of polyurethane foam, a fibrous material of either natural or synthetic fibers or a combination of both, can be applied to the solvent before the foam becomes hardened and the fibrous material will become laminated on the surface of the foam strengthening it and also providing a surface that is more resistant to wearing or abrasive action. It is very advantageous to be able to convert the re-expanded foam to rigid foam and vice versa. For instance, the flexible foam can be formed around an object as a packing and then made rigid, and upon unpacking can be removed without cutting the foam by again making it flexible.

An alternate method of making the flexible foam rigid in the field comprises impregnating the flexible foam with a catalyzed polyester or epoxy resin, and allowing the composite material to harden.

I claim:
A method of compressing and re-expanding flexible polyurethane foam comprising the steps of:
 (a) Impregnating flexible polyurethane foam with an adhesive solution of dimethyl hydantoin formaldehyde containing water as a solvent, said adhesive and solvent rendering said polyurethane transparent;
 (b) Evaporating said solvent from said adhesive solution;
 (c) Compressing the foam to a fraction of its original volume, said foam remaining in this compressed state for transport;
 (d) Re-expanding said compressed polyurethane foam to its flexible state by immersing said foam in a solvent for said adhesive; and
 (e) Squeezing out the excess solvent.

References Cited by the Examiner
UNITED STATES PATENTS 2,659,935 11/53 Hammon _____ 264—321
2,666,954 1/54 Potter _____ 264—321 XR
3,000,464 9/61 Watters _____ 264—41 XR ALEXANDER H. BRODMERKEL, *Primary Examiner.*